William Kulmann
INVENTOR.

BY Murray Robinson
ATTORNEY

United States Patent Office 2,796,946
Patented June 25, 1957

2,796,946

SOUND ABSORBING AND CORRECTING MATERIAL AND METHOD OF MAKING SAME

William Kulmann, Houston, Tex., assignor to Industrial Research Laboratories, Inc., San Antonio, Tex., a corporation of Texas Application July 15, 1954, Serial No. 443,648

9 Claims. (Cl. 181—33)

This invention pertains to a cavernous material especially adapted for sound absorption and heat insulation and to a method of making same. More specifically this invention pertains to cast tiles and panels of dispersed gypsum.

The object of the invention is to provide a material which has sufficient cavities therein to be an efficient sound absorber.

A further object of the invention is to provide a material which is a good heat insulator.

Still another object of the invention is to provide such a material which will be of low density.

Another object of the invention is to provide such a material which will be non-inflammable and which will not smoke when exposed to fire.

A further object of the invention is to provide such a material which can be readily cut with an ordinary wood saw and which can be nailed.

Still another object of the invention is to produce such a material which will be non-hydroscopic.

Still another object of the invention is to provide such a material which will have sufficient strength and rigidity to be easily handled and to be self supporting over wide spans and to remain flat against a wall or ceiling to which it is secured.

An important object of the invention is to provide such a material which will be inexpensive to manufacture.

A further object of the invention is to provide such a material which can be cast and pressed into any desired shape.

Yet another object of the invention is to provide a tile having an efficient sound absorbing surface.

A further object of the invention is to provide such a tile which will have an ornamental appearance.

Another object of the invention is to provide such a tile which will be light diffusing.

It is also an object of the invention to provide such a tile which will be strong, rigid, non-hygroscopic, fire proof, non-smoking, non-warping, and inexpensive.

A further object of the invention is to provide an inexpensive and simple method of manufacturing such as material and tile.

Other objects and advantages of the invention will appear from the following description of a preferred embodiment thereof, reference being made to the accompanying drawing wherein.

According to the invention sodium bentonite is added to clean water and mixed, preferably by beaters turning at about 7000 R. P. M. A magnified version of a Waring blender is suitable for this operation. This produces a clay gel or dispersion.

To the gelled mixture is added coarse ground cardboard, rock wool fibers or similar light fibrous material. A desired fibrous material is produced by putting cardboard through a hammer mill with bar spacers not more than ½" nor less than ⅛" apart. Most of the material thus produced will have a maximum dimension not greater than the spacing of the bars, for little material will be extended lengthwise therethrough.

The mixture of the clay dispersion and cardboard particles is also mixed, preferably by spinning, with the beaters revolving at about 7000 R. P. M. The resulting mixture is a stiffer gel or dispersion than before. To this mixture is admixed Portland cement which is also preferably spun in with the beaters at 7000 R. P. M. Finally, plaster of Paris (calcium sulfate hemihydrate produced by calcining gypsum) is mixed in, preferably being spun in at 10,000 R. P. M., and the mixture so obtained is ready to be cast by pouring into open molds or injecting into closed molds. Throughout the steps of mixing, admixing and the final mixing with plaster of Paris described above, the gel state, which is initially obtained in the water-clay dispersion, is retained in the mixture.

As an example of the proper proportion, the following is an example of the materials required to make a 3½" x 14" x 48" insulating panel having five 1½" diameter lengthwise holes and having a dry weight of approximately 28 pounds.

The required amount of water is mixed with:

2 pounds of sodium bentonite
4 pounds of coarse cardboard fibre
1 pound of Portland cement
21 pounds of calcined gypsum It will be understood that the amount of water needed will vary but the volume of water will be approximately the same as that of the finished panel. The times for spinning likewise will vary according to various factors but the first mixture should be spun until a good gel is obtained. In quantities of the magnitude given in the above example the gypsum plaster should not be spun for more than about two minutes.

Due to its impregnation with the clay, cement and plaster, the cardboard will be fireproof and non-smoking. However, if desired, some inorganic fibre such as rock wool may be substituted for the cardboard.

The casting mixture will set up in the mold after about twenty minutes and can then be removed from the mold and either dried in a kiln at 300–400° F. or in the open air.

Figure 1:
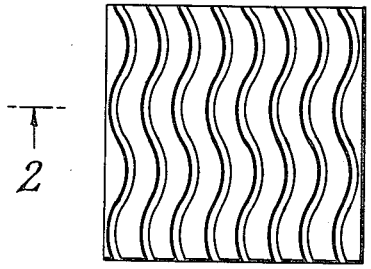
Figure 1 is a plan view of an ornamental sound correcting tile embodying the invention.
Figure 2:
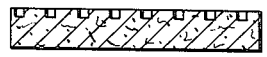
Figure 2 is a section on line 2—2 of Figure 1.
Figure 3:
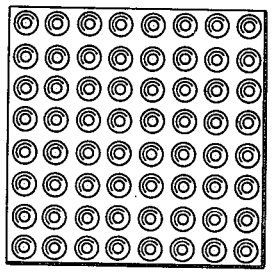
Figure 3 is a plan view of a modified form of sound absorbing tile according to the invention.
Figure 4:
Figure 4 is a section on line 4—4 of Figure 3.
Figure 5:
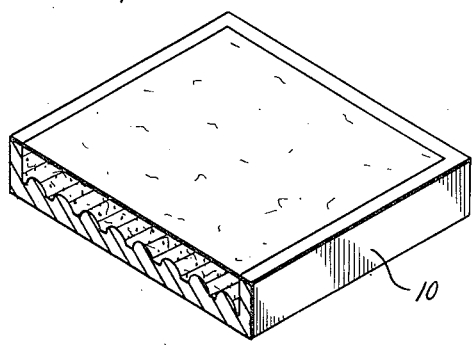
Figures 5 and 6 are schematic sectional views through a mold box and press respectively for producing a tile as shown in Figures 3 and 4.
Figure 6:
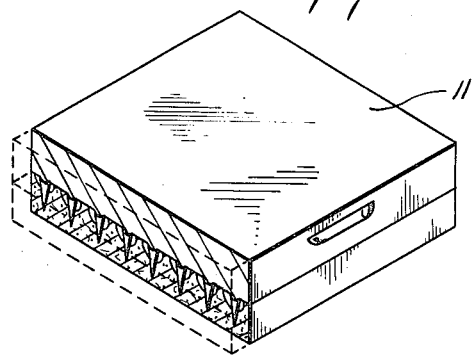

If the material is to be used for sound absorption or correction it should be formed to provide air increased surface area. For example, as shown in Figures 1 and 2 it may have an ornamental design in relief thereon. A more efficient sound absorbing tile will have rounded, preferably spherical, depressions therein as close together as is structurally and mechanically parcticable. The apex of each depression will be extended in the form of a deep, preferably conical, hole. This shape is found to be highly efficient, especially when used with a highly porous material as above described, since the depressions and holes form sound traps in the hardened product. Figures 5 and 6 show how such sound traps can be formed. The cast material with the spherical depressions molded in it is removed from the mold box 10 and the holes are formed by pressing the material with a suitable die 11 before it has hardened.

While preferred embodiments of the invention have been shown and described, many modifications thereof can be made by one skilled in the art without departing from the spirit of the invention and it is desired to cover by Letters Patent all forms of the invention falling within the scope of the following claims.

I claim:

1. A composition of matter consisting essentially of a hydrated dispersion of the following materials in approximately the following proportions by weight:

2 parts sodium bentonite
    4 parts coarse fibrous particles
    1 part Portland cement
    21 parts gypsum plaster 2. Composition according to claim 1 in which the fibrous particles are particles of cardboard, most of which have a maximum dimension in the range ¼″ to ½″.

3. Composition according to claim 1 in which the fibrous particles are rock wool.

4. Method of making a casting mixture comprising dispersing sodium bentonite clay in water, mixing fibrous particles with the dispersion, admixing Portland cement with the fiber-clay-water mixture, and mixing gypsum plaster with the cement-fibre-clay-water admixture, while at all times retaining a gel state after the gelling of the original water-clay dispersion.

5. Method according to claim 4 in which the dispersing, mixing, and admixing are done with beaters revolving at about 7000 R. P. M. and the final mixing is with beaters revolving at 10,000 R. P. M.

6. Method of making a cast material comprising adding to the required amount of water about two parts by weight of sodium bentonite and spinning it at about 7000 R. P. M. to produce a gel-like dispersion, spinning in about four parts by weight of coarse cardboard particles at about 7000 R. P. M., spinning in about one part by weight of Portland cement at about 7000 R. P. M., adding about 21 parts by weight of gypsum plaster and spinning at about 10,000 R. P. M. for not over two minutes, placing the product of the foregoing steps in a mold, leaving the product in the mold long enough to set, which is of the order of twenty minutes, removing the product from the mold, and drying.

7. Method according to claim 6 in which the drying is in a kiln at about 300–400° F.

8. Method according to claim 6 in which the material is cast in molds, one surface of said product is pressed with a die having a three dimensional configuration of large area relative to the plane projected area thereof.

9. Method according to claim 8 in which said surface is flat except for a plurality of spherical depressions, and after the product has set it is removed from said mold and pressed with a die which has a tapered pin for each of said depressions to make a hole in the bottom thereof.

References Cited in the file of this patent

UNITED STATES PATENTS

| | | |
|---|---|---|
| 635,996 | Coale | Oct. 31, 1899 |
| 824,012 | Harris et al. | June 19, 1906 |
| 1,804,884 | Mazer | May 12, 1934 |
| 1,966,069 | Kliefoth | July 10, 1934 |
| 2,280,631 | Coffey | Apr. 21, 1942 |